United States Patent [19]
Vasiliev et al.

[11] 4,210,837
[45] Jul. 1, 1980

[54] PIEZOELECTRICALLY DRIVEN TORSIONAL VIBRATION MOTOR

[76] Inventors: Petr E. Vasiliev, ulitsa Ugnyagyasju, 9, kv. 17, Vilnjus; Kazimiras M. Ragulskis, ulitsa Donelaichio, 17, kv. 20, Kaunas; Ionas A. Savitskas, ulitsa Kauno, 25, kv. 104, Vilnjus; Vitaly M. Misikov, ulitsa Karolinishkju, 13, kv. 226, Vilnjus; Oleg D. Topolnitsky, ulitsa Dzerzhinskogo, 130, kv. 47, Vilnjus, all of U.S.S.R.

[21] Appl. No.: 18,594

[22] Filed: Mar. 8, 1979

[51] Int. Cl.$^2$ ............................................. H01L 41/10
[52] U.S. Cl. ..................................... 310/323; 310/325; 310/333
[58] Field of Search ............... 310/321, 323, 325, 328, 310/333; 51/59 SS; 74/1 R, 1 SS; 366/600

[56] References Cited
U.S. PATENT DOCUMENTS
3,184,842  5/1965  Maropis ........................... 310/323 X

FOREIGN PATENT DOCUMENTS
4420436  5/1966  Japan .......................................... 310/369
532947   2/1977  U.S.S.R. .................................... 310/323
576648  10/1977  U.S.S.R. .................................... 310/323

*Primary Examiner*—Mark O. Budd
*Attorney, Agent, or Firm*—J. Harold Nissen

[57] ABSTRACT

The vibration motor of the invention comprises a concentrator of torsional vibrations including at least two stages. The first one of the stages takes up vibrations from a piezoelectric cell while the second stage contacts a rotor. The concentrator is provided with means for transforming piezoelectric cell vibrations into torsional ones, said means being fashioned as rods provided on the side surface of the first stage. The rods are located in a plane normal to the concentrator axis and inclined each at an acute angle to a tangent at the point where the rod is attached to the line of intersection of the side surface of the first stage with said plane. The rods serve as resonators of longitudinal vibrations propagating therein.

10 Claims, 14 Drawing Figures

PIEZOELECTRICALLY DRIVEN TORSIONAL VIBRATION MOTOR

FIELD OF THE INVENTION

The present invention relates to electric motors and, more particularly, it relates to vibration motors intended for use in sound-recording and -reproducing devices, for example, in electric playback devices.

BACKGROUND OF THE INVENTION

There is known in the art a vibration motor comprising a concentrator of longitudinal vibrations consisting of two series-arranged stages. The first stage contacts a piezoelectric cell while the second, driving, stage is fashioned as circumferentially arranged inclined rods coupled by their ends with a rotor.

Such a design is characterized by a low torque of the rotor in view of a small area of contact between the concentrator and rotor. An increase in the number of rods results in additional energy losses due to parasitic bending vibrations of said rods.

For increasing the contacting surface in vibration motors use can be made of prior art concentrator of torsional vibrations comprising two cylinder-shaped stages arranged coaxially and in series with each other. The first one of said stages has a larger cross-sectional area, contacts a piezoelectric cell and is provided with means for transforming longitudinal vibrations imparted to said stage by the piezoelectric cell into torsional vibrations. The function of the vibration transforming means is served by oblique slots provided in the first stage along the line of propagation of torsional vibrations. The second, driving, stage contacts a rotor over the entire end surface thereof.

The concentrator length l is selected in accordance with the formula $$\lambda_1/4 < l = \lambda_2/2 \qquad (I)$$

wherein $\lambda_1$ is the wavelength of longitudinal vibrations in the rod, and $\lambda_2$ is the wavelength of torsional vibrations in the rod, or the formula $$\lambda_3/4 < l = \lambda'_2/2 \qquad (II)$$

wherein $\lambda_3$ is the wavelength of radial vibrations, and $\lambda'_2$ is the wavelength of torsional vibrations in a radial medium, depending upon the specific concentrator embodiment (cf., M. G. Sirotjuk, Transformation of Acoustic Longitudinal Vibrations to Shear or Torsional Ones, Akusticheskii zhurnal-Acoustic Journal, vol. 5, No. 2, 1959, p. 254). The concentrator of the vibration motor is excited by longitudinal vibrations, however, the choice of the concentrator dimensions in accordance with Formula (I) or (II) and the provision of oblique slots result in the shaping of torsional vibrations. As a result, the driving stage surface is oscillated by longitudinal-torsional or radial-torsional vibrations whose energy sets to rotation the rotor contacting the concentrator.

The torque on the shaft of a vibration motor provided with such concentrator is higher as compared to a vibration motor the driving stage of whose concentrator is fashioned as inclined rods, owing to an increased area of contact of the concentrator driving stage with the rotor. However, the power of such vibration motor is inadequate in view of a low value of the coefficient of vibration displacement concentration and, as a result, of a low amplitude of torsional vibrations at the concentrator outlet.

SUMMARY OF THE INVENTION

It is an object of the present invention to increase the power of the vibration motor.

It is another object of this invention to reduce the overall dimensions of the vibration motor.

It is still another object of the present invention to simplify the technique of manufacturing the vibration motor.

The present invention resides in that, in a vibration motor comprising a concentrator of torsional vibrations including at least two cylinder-shaped stages arranged coaxially and in series with each other, of which the first stage has a larger cross-sectional area and takes up vibrations from a piezoelectric cell while the second, driving, stage contacts a rotor, said concentrator being further provided with means for transforming vibrations of the piezoelectric cell into torsional ones, according to the invention, the means for transforming vibrations is fashioned as rods provided on a side surface of the first stage in a plane normal to the concentrator axis and inclined each at an acute angle to a tangent at a point where the rod is attached to the line of intersection of the side surface with said plane, said rods serving as resonators of longitudinal vibrations propagating therein.

In order to increase the vibration concentration coefficient, it is desirable that the vibration motor be provided with a ring flange arranged on the side surface of the first stage concentrically with the latter and serving as a resonator of torsional vibrations.

It is expedient that the ring flange be arranged between the side surface of the first stage and the rods.

It is also desirable that the ring flange have a variable thickness decreasing from the periphery of the ring to its center.

The plane of location of the rods can be positioned with respect to the nodal zone of torsional vibrations of the concentrator at a distance not exceeding one-third of the length of the first stage.

In case the rods are located on the side surface of the ring flange, it is expedient that the angle of inclination of the rods be selected such that the other side of each one of the acute angles be formed by a tangent to the line of intersection of the side surface of the second stage with the plane of location of the rods, passing through a point where the appropriate rod is attached to the surface of the flange.

In case the piezoelectric cell is pressed against the first stage by means of a threaded joint, it is desirable that the direction of thread coincide with the direction of the rods.

With a view to reducing to the minimum the dimensions of the vibration motor, it is expedient that the concentrator stages and the piezoelectric cell be fashioned as concentrically arranged rings, one side surface of the ring-shaped structure contacting the rotor while the other surface accommodates the rods.

The vibration motor according to the present invention features an increased power and a coefficient of vibration displacement concentration increased by a factor of about 2.5 as compared to that of prior art vibration motors, thanks to which the vibration motor of the invention can be used in high-quality electric playback devices characterized by a high starting torque. The various embodiments of the herein disclosed vibration motor, utilizing radial and torsional vibrations, feature an adequate power while having low overall height and being simple in manufacture.

BRIEF DESCRIPTION OF THE DRAWINGS

This invention will be better understood upon considering the following detailed description of specific embodiments thereof, with due references to the accompanying drawings in which.

DETAILED DESCRIPTION OF THE INVENTION

Figures 1, 3:
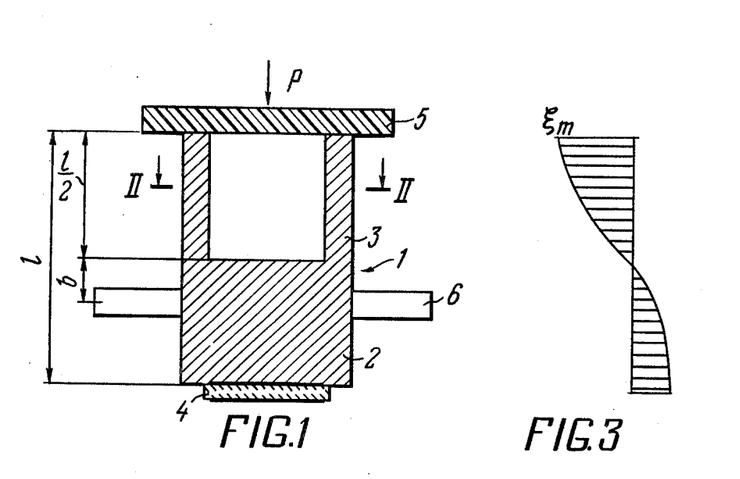
FIG. 1 is a sectional diagrammatic view of the vibration motor according to the invention, with rods provided in the first stage.
FIG. 3 is the diagram of amplitudes of torsional vibrations, $\xi_m$, propagating over the concentrator length.
Figure 2:
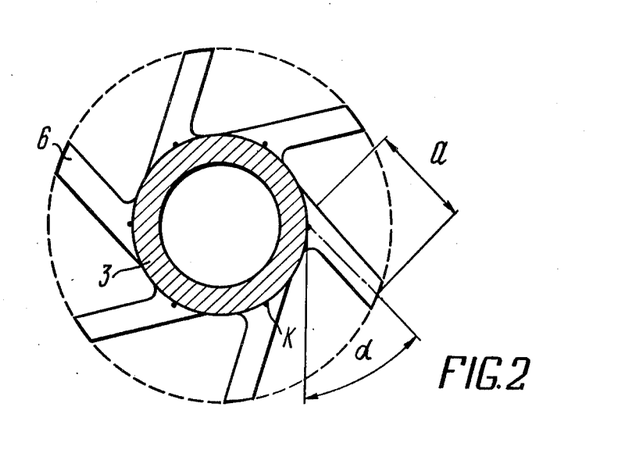
FIG. 2 is a section taken along the line II—II of FIG. 1.

Referring now to FIGS. 1, 2 of the accompanying drawings, the vibration motor of the invention comprises a concentrator 1 of longitudinal and torsional vibrations, including two stages 2, 3 arranged in series one after the other. The stage 2 is cylinder-shaped and has a larger cross-sectional area. The driving stage 3 is shaped as a hollow cylinder and has a smaller cross-sectional area. Pressed (glued) to the stage 2 is a piezoelectric cell 4 while the stage 3 contacts by its end surface a rotor 5 of the vibration motor, pressed against said surface by force P. The concentrator 1 is made half-wave, the length l/2 of the stage 2 being equal to one-quarter of the wavelength of torsional vibrations in the rod, same as the length of the stage 3 ($l/2 = \lambda_2/4$). Attached to the side surface of the stage 2 are rods 6 located in a plane normal to the axis of the concentrator 1 and inclined at acute angles $\alpha$ to a tangent at point K at which the rod 6 is secured to the line of intersection of the side surface of the stage 2 with the plane of location of the rods 6. The rods 6 serve as resonators of longitudinal vibrations occurring therein and their length a is equal to one-quarter of the wavelength of longitudinal vibrations ($a = \lambda_1/4$). The plane of location of the rods 6 is at a distance b from the nodal zone of torsional vibrations of the concentrator 1, which zone is near the line of contact between the stage 2 and the stage 3 (cf., FIG. 3), said distance b not exceeding one-third of the length of the stage 2, i.e., $b = \leq 1/3 \cdot l/2$.

Figure 4:
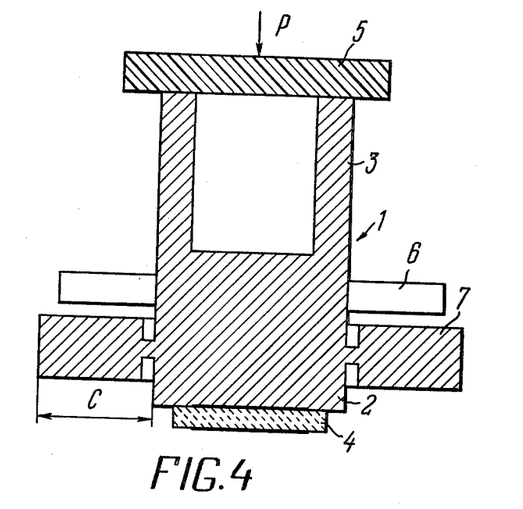
FIG. 4 is a sectional view of vibration motor embodiment provided with a ring flange.

As distinct from the vibration motor according to FIG. 1, the vibration motor embodiment shown in FIG. 4 comprises a ring flange 7 secured on the stage 2 concentrically with the latter at a small distance from the plane of location of the rods 6. The flange 7 serves as a resonator of torsional vibrations and its width c is equal to one-quarter of the wavelength of torsional vibrations in radial medium ($c = \lambda'_2/4$).

Figure 5:
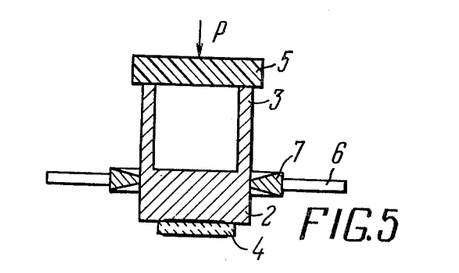
FIG. 5 is a sectional view of vibration motor embodiment provided with rods on the periphery of the ring flange.

According to the vibration motor embodiment shown in FIG. 5, the ring flange 7' is arranged between the side surface of the stage 2 and the rods 6 so that the latter rods turn out to be located on the outer side surface of the flange. In addition, the flange 7' has a variable thickness decreasing from the ring periphery to its center.

Figure 6:
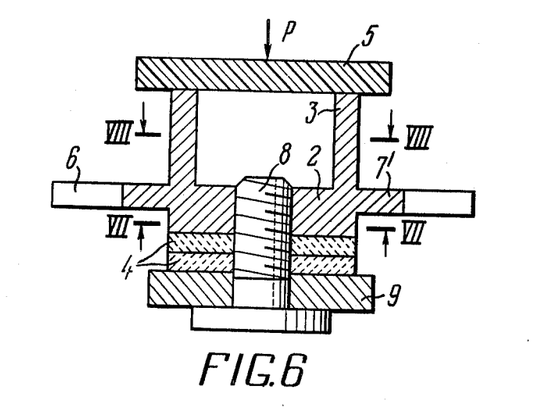
FIG. 6 is a sectional view of vibration motor embodiment wherein a piezoelectric cell is pressed by means of a threaded joint.
Figure 7:
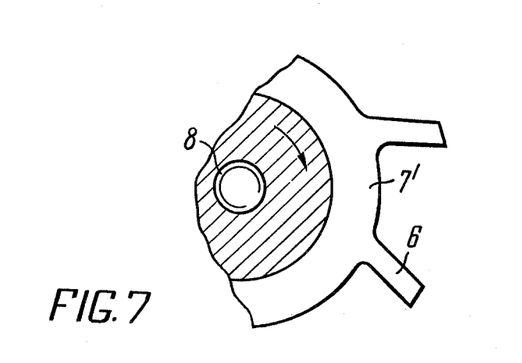
FIG. 7 is a section taken on the line VII—VII of FIG. 6.

Shown in FIGS. 6, 7 is a vibration motor wherein the piezoelectric cells 4 are pressed against the stage 2 by means of a threaded joint through the intermediary of a bolt 8. The direction of thread shown with arrow A coincides with the direction of the rods 6. Shown at 9 is a frequency-decreasing cover plate made of the same material as the stages 2, 3 of the concentrator 1.

Figure 8:
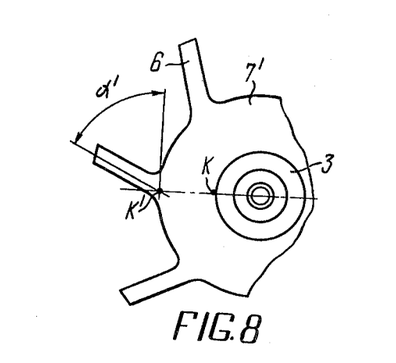
FIG. 8 is a section taken on the line VIII—VIII of FIG. 6.

FIG. 8 shows the preferred angle $\alpha'$ of inclination of the rods 6. The sides of the angle $\alpha'$ are provided by a tangent at point K' to the line of intersection of the side surface of the flange 7' and a tangent to the line of intersection of the side surface of the stage 3 to the plane of location of the rods 6, said latter tangent passing through the point K'.

The vibration motor embodiments shown in FIGS. 9, 10, 11, 12, 13 and 14 are based on a concentrator 10 of radial and torsional vibrations. The concentrator 10, similar with those of the preceding embodiments, is made half-wave and has a length $l = \lambda'_2/2$ (the width of the ring structure of the concentrator of torsional vibrations). Stages 11 and 12 of the concentrator 10 are fashioned as concentric rings, with a piezoelectric cell 13 likewise having a ring shape being built in the stage 11.

Figure 9:
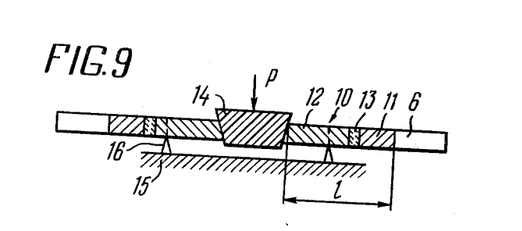
FIG. 9 shows a vibration motor embodiment with a rotor arranged in the center of a ring-like structure.
Figure 10:
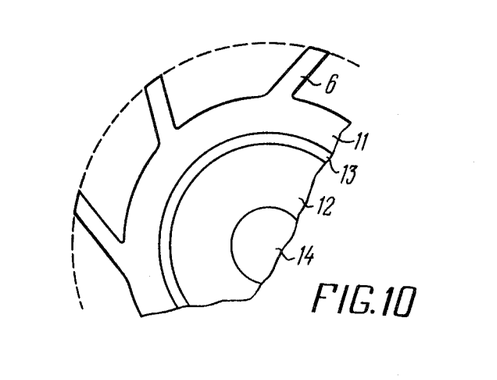
FIG. 10 is a plan view of FIG. 9.

In the vibration motor embodiment shown in FIGS. 9, 10, the inner side surface of the concentrator 10 contacts a rotor 14 having the shape of truncated cone for better contact. Attached to the outer side surface of the concentrator 10 are the rods 6—resonators of longitudinal vibrations. The vibration motor is mounted on a casing 15 with the aid of supports 16 located in the nodal zone (shown with broken line) of torsional vibrations in radial medium.

Figure 11:
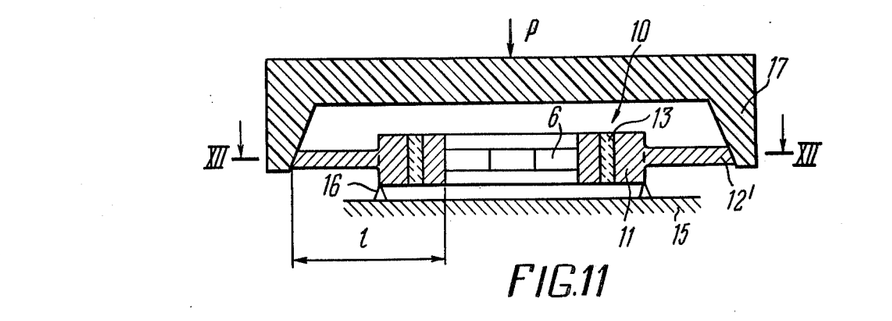
FIG. 11 is a sectional view of a vibration motor embodiment with a rotor arranged on the circumference of a ring-like structure.
Figure 12:
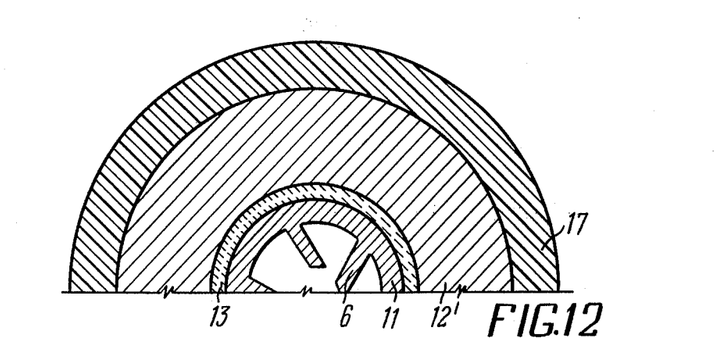
FIG. 12 is a section taken on the line XII—XII of FIG. 11.

According to the vibration motor embodiment shown in FIGS. 11, 12, a rotor 17 contacts the outer side surface of the ring concentrator 10, the contacting surfaces being made tapered. A driving stage 12' is of lessen thickness than the stage 11. In this version of the vibration motor, the rods 6 are located on the inner side surface of the concentrator 10.

Figure 13:
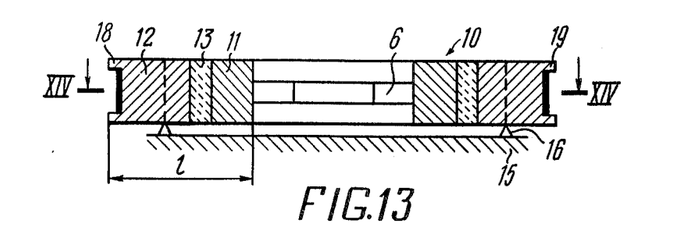
FIG. 13 is a sectional view of an embodiment of vibration motor for driving a magnetic tape.
Figure 14:
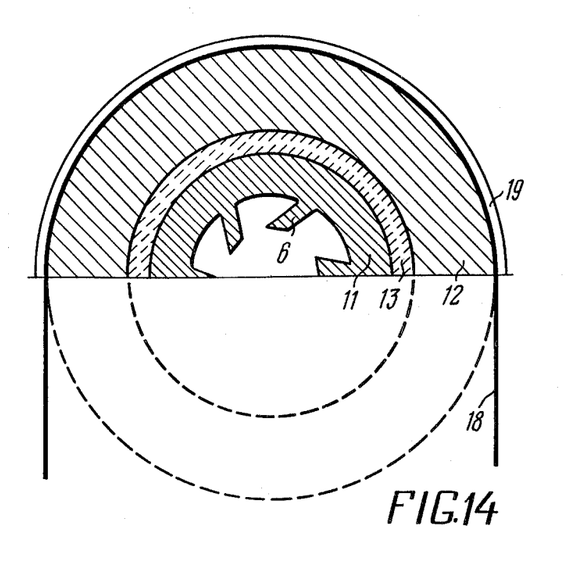
FIG. 14 is a sectional taken on the line XIV—XIV of FIG. 13.

The vibration motor shown in FIGS. 13, 14 is intended for use as a magnetic tape drive, the magnetic tape 18 serving as a rotor and contacting the outer side surface of the concentrator 10. The outer side surface of the concentrator 10 is provided with guide projections 19 for securing the tape 18. The rods 6, similar to the preceding embodiment, are attached to the inner side surface of the concentrator 10.

The vibration motor of the present invention operates in the following manner.

Upon excitation of the piezoelectric cell 4 (FIGS. 1, 2, 3) from a source of high-frequency electric oscillations (not shown in the drawings), mechanical ultrasonic vibrations emerge in said cell. Said vibrations propagate in the concentrator 1 to excite therein vibration displacements of the various types, including torsional one. Torsional vibrations of the stage 2 excite longitudinal vibrations in the inclined rods 6. Inasmuch as the rods 6 are made resonant on the excited frequency ($a = \lambda_1/4$), in the zone of junction of said rods 6 with the stage 2 there occur great variable vibration forces directed at an angle $\alpha$ to the side surface of the stage 2. The tangential components of said forces make for an increase of torsional vibrations in the stage 2. An additional increase of torsional vibrations occurs upon their propagation towards the end surface of the stage 3 owing to the half-wave arrangement of the concentrator 1 and reduction of the cross-sectional area of the concentrator 1 upon transition from the stage 2 to the stage 3.

In accordance with Poisson effect, non-resonant longitudinal vibrations emerge in the concentrator 1 concurrently with resonant torsional vibrations. The energy of longitudinal and torsional vibrations of the driving stage 3 sets to rotation the rotor 5. The reversal of the rotor 5 is effected by detuning the source of electric oscillations away from the resonance of torsional vibrations.

The vibration motor shown in FIG. 4 operates analogously with that illustrated in FIG. 1, with the only difference that the provision of the ring flange 7 ensures an additional amplification of the amplitude of torsional vibrations owing to the resonant properties of the flange 7 ($c = \lambda'_2/4$). The flange 7 is relatively heavy and performs an additional function of a vibrational energy accumulator, thereby providing for the stabilization of amplitudes of torsional vibrations on the end surface of the stage 3 in the presence of interference introduced by the load.

The vibration motor design shown in FIG. 5 is characterized by a still higher coefficient of vibration concentration. The additional amplification of the amplitudes of torsional vibrations is ensured in this case, first, owing to the location of the rods 6 at a greater distance from the axis of the concentrator 1, as a result of which the vibration forces acting near the base of the rods 6 are shaped over a greater area and, second, owing to the reduction of the thickness of the flange 7' in the direction towards the side surface of the stage 2 and the resulting additional concentration of the amplitudes of torsional vibrations on the side surface of the concentrator stage 2. The location of the rods 6 and of the flange 7(7') at a distance from the nodal zone of torsional vibrations which does not exceed one-third of the length of the stage 2 provides for the excitation of torsional vibrations with lower consumption of the energy of electric oscillations.

By pressing the piezoelectric cells 4 (FIGS. 6, 7) with the aid of a threaded joint, the amplitude of torsional vibrations of the concentrator 1 can be somewhat increased provided the direction of thread coincides with the direction of the rods 6. This can be attributed to the fact that the thread, as well as the rods 6, makes for the emergence and orientation of torsional vibrations in the concentrator.

The angle $\alpha$ of inclination of the rods 6 also affects the amplitude of torsional vibrations and, consequently, the rate of rotation of the rotor 5. At $\alpha = \beta'$, the rate V of rotation of the rotor 5 reaches its optimum value V' and, the greater the difference between the angles $\alpha$ and $\alpha'$, the more substantial the difference between the rotor rate V and its optimum value V'. The foregoing is supported by the data contained in the Table.

Table

| $\alpha'/\alpha$ . 100% | 5 | 10 | 20 | 50 |
|---|---|---|---|---|
| V'/V . 100% | 2 | 4 | 12 | 40 |

The vibration motor embodiments shown in FIGS. 9-14 operate in the following manner.

Upon excitation of the piezoelectric cell 13 from the high-frequency electric oscillator, the various ultrasonic vibrations occur in said cell, including radial and torsional ones. These vibrations excite longitudinal vibrations in the inclined rods 6. Since the inclined rods 6 are fashioned as quarter-wave resonators of longitudinal vibrations propagating over the length thereof, at the junction of the rods 6 with the ring structure of the concentrator 10 there occur intensive vibration forces whose tangential components serve as "generators" (sources) of torsional vibrations in the concentrator 10. Inasmuch as the ring stage 11 is also resonant (half-wave) over its width at a preset frequency, the stage 11 resonates and large-amplitude torsional vibrations are shaped in the driving portion of the concentrator 10 (stages 12, 12').

The advantage of the last-described embodiments of the vibration motor over those described earlier resides in the simplicity of their manufacture (all of the metal parts are made by stamping) and in the reduction of their overall height by a factor of 1.5-3.

What is claimed is:

1. A vibration motor comprising: a concentrator of torsional vibrations; a cylinder-shaped first stage of said concentrator; a cylinder-shaped second stage of said concentrator, having a cross-sectional area smaller than that of said first stage and rigidly coupled with said first stage; a piezoelectric cell contacting said first stage; a rotor contacting said second stage; rods provided on a side surface of said first stage in a plane normal to the axis of said concentrator; said rods being inclined each at an acute angle to a tangent at a point where said rod is attached to a line of intersection of the side surface of said first stage with said plane of location of the rods; said rods serving as resonators of torsional vibrations propagating therein.

2. A vibration motor as set forth in claim 1, wherein said concentrator stages and piezoelectric cell are fashioned as concentrically arranged rings; one side surface of the thus formed ring-shaped structure contacting said rotor while the other side surface accommodates said rods.

3. A vibration motor as set forth in claim 1, comprising a ring flange located on said side surface of the first stage concentrically therewith and serving as a resonator of torsional vibrations.

4. A vibration motor as set forth in claim 3, wherein said ring flange is arranged between said surface of the first stage and said rods.

5. A vibration motor as set forth in claim 3, wherein said ring flange has a variable thickness decreasing from the ring periphery to its center.

6. A vibration motor as set forth in claim 4, wherein said ring flange has a variable thickness decreasing from the ring periphery to its center.

7. A vibration motor as set forth in claim 1, wherein the distance of said plane of location of the rods from the nodal zone of torsional vibrations of said concentrator does not exceed one-third of the length of said first stage.

8. A vibration motor as set forth in claim 3, wherein the distance of said ring flange from the nodal zone of torsional vibrations of said concentrator does not exceed one-third of the length of said first stage.

9. A vibration motor as set forth in claim 4, wherein the other side of each one of said acute angles is formed by a tangent to a line of intersection of the side surface of said second stage with said plane of location of the rods, passing through a point where the appropriate rod is attached to the side surface of said flange.

10. A vibration motor as set forth in claim 7, wherein said piezoelectric cell is pressed against the first stage by means of a threaded joint the direction of whose thread coincides with the direction of said rods.

* * * * *

UNITED STATES PATENT AND TRADEMARK OFFICE
CERTIFICATE OF CORRECTION

PATENT NO. : 4,210,837

DATED : July 1, 1980

INVENTOR(S) : Petr Egorovich VASILIEV et al

It is certified that error appears in the above—identified patent and that said Letters Patent is hereby corrected as shown below:

Column 6, Line 3 "$\alpha=\beta'$," should be --$\alpha=\alpha'$,--

Signed and Sealed this

Eleventh Day of November 1980

[SEAL]

Attest:

SIDNEY A. DIAMOND

Attesting Officer

Commissioner of Patents and Trademarks